C. A. SIMMONS.
SCALPEL.
APPLICATION FILED MAY 26, 1913.
1,181,931.                                    Patented May 2, 1916.
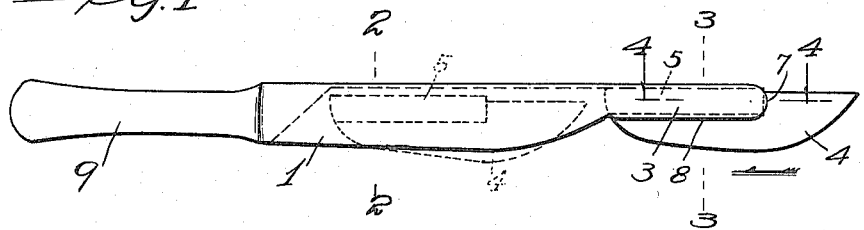
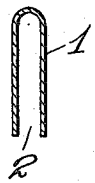
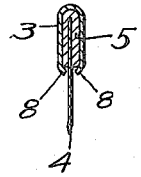
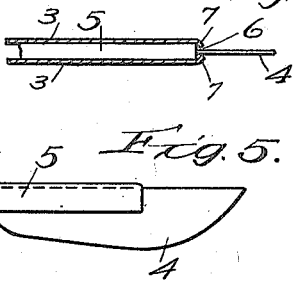
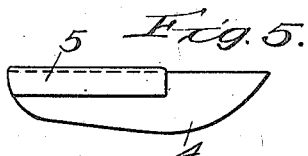
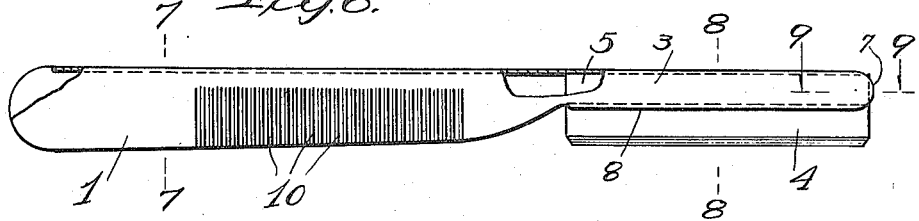
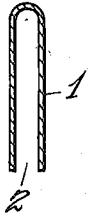
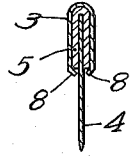
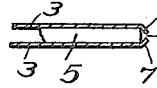
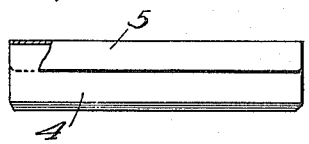
Witnesses:
Inventor
Charles A. Simmons
by Parker & Carter
his Atty's

UNITED STATES PATENT OFFICE.

CHARLES A. SIMMONS, OF CHICAGO, ILLINOIS.

SCALPEL.

1,181,931.         Specification of Letters Patent.         Patented May 2, 1916.

Application filed May 26, 1913. Serial No. 769,786.

*To all whom it may concern:*

Be it known that I, CHARLES A. SIMMONS, a citizen of the United States, residing at Chicago, in the county of Cook and State of Illinois, have invented a certain new and useful Improvement in Scalpels, of which the following is a specification.

My invention relates to improvements in scalpels, and has for its object to provide a new and improved device of this description.

One of the difficulties attending the use of the ordinary scalpel is that it is difficult to keep it sharp and the result is that when everything is ready for the operation, it is often found that the scalpel is dull. A scalpel is also often dropped on the hard floor and the edge dulled or injured just at the time when it is desired to use it.

My invention has among other objects to provide a scalpel by means of which a sharp blade can always be insured and by means of which the blades can be quickly changed if dulled or injured and which can at the same time be easily sterilized.

Referring now to the accompanying drawings, Figure 1 is a view showing one form of scalpel embodying the invention; Fig. 2 is a sectional view taken on line 2—2 of Fig. 1; Fig. 3 is a sectional view taken on line 3—3 of Fig. 1; Fig. 4 is a sectional view taken on line 4—4 of Fig. 1; Fig. 5 is a view of the blade shown in Fig. 1 removed from the handle; Fig. 6 is a view showing a modified construction; Fig. 7 is a sectional view taken on line 7—7 of Fig. 6; Fig. 8 is a sectional view taken on line 8—8 of Fig. 6; Fig. 9 is a sectional view taken on line 9—9 of Fig. 6; Fig. 10 is a view of the blade shown in Fig. 6 removed from the handle.

Like numerals refer to like parts throughout the several figures.

Referring now to Figs. 1–5, I have shown a handle edge formed of a single piece of material, such for example as steel. The handle is hollow as provided at the bottom of the slot 2. This handle has a blade-holding part 3 which holds the blade 4 in position. The blade-holding part is integral with the handle, but is narrower than the handle so that a proper proportion of the blade will be exposed. The blade 4 is provided with an engaging part 5 which is bent around the upper edge thereof and connected therewith. This engaging part is moved into the hollow of the blade-holding part 3 and is the means by which the blade and the handle are connected together.

The blade holding part is preferably open at the front end, there being a slit 6, the edges of the material being bent over as shown at 7 so as to form stops against which the engaging part 5 strikes to limit the movement of the blade. The sides of the blade holding part 3 are arranged so as to have a spring action to grip the part 5 to hold the blade in position. The lower edges of the part 3 are also bent over as shown at 8 in Fig. 3 to hold the blade against lateral movement, the edges 7 holding it against longitudinal movement.

In attaching the blade to the handle, the blade is inserted in the main body of the handle through the opening or slot 2 as shown in dotted lines in Fig. 1, and is then slid forward so that the part 5 enters the part 3 and until said part 5 is stopped by the stop 7. The blade is then gripped so as to be ready for use. In operating the blade is generally moved in the direction of the arrow (see Fig. 1) so that the stop 7 takes the pressure during use. In Fig. 1, the rear end of the handle is provided with a piece 9 which may be attached thereto in any desired manner as by being soldered and which is preferably a solid piece arranged so that it may be used to separate the tissues. In Fig. 1 the part 5 only extends along a portion of the blade 4, the front end of the blade projecting from the handle. In Fig. 6, I have shown a modified construction where the part 5 extends the entire length of the blade and the blade does not project from the handle. The construction otherwise is similar.

In Fig. 6, I have shown the handle as roughened at 10 so that slippage is prevented during use, the rough or holding portion giving the operator a firmer grip. In this case the end opposite the blade may also be used to separate the tissues.

The solid part 9 at the end of the handle is made in the shape of a fish tail, but it may be made in any form.

The spring action of the metal and the friction holds the blade in position in the blade holding part.

I claim:

1. A scalpel comprising a handle and blade holding part integral with each other, both said handle and blade holding part being hollow, the hollow portions of the two connected together so that the blade may be inserted in the hollow portion of the handle and moved therealong into the hollow portion of the blade holding part, the sides of the handle part being of greater width than those of the blade-holding part, the hollow portion of the blade holding part being narrower than that of the handle, so that the sides of the blade holding part engage the blade and hold it in position by friction, and a positive stop for limiting the longitudinal movement of said blade in a direction away from the handle portion.

2. A scalpel comprising a handle and a blade holding part rigidly connected together and integral with each other, said handle and blade holding part formed by bending a piece of metal into a U-shape so as to form a structure with a back and two sides, but open at the bottom, the sides of the handle being of greater width than those of the blade holding part, the sides of the blade holding part being closer together than the sides of the handle portion, a blade, an engaging part fastened to said blade and extending part of the width of the blade, the lower edges of the said pieces of the blade holding part being bent inwardly so that the open space between them is large enough to permit the blade to enter but not large enough to permit the engaging part to enter, whereby the blade when inserted in the handle and moved longitudinally to the blade holding part, will be held against removal therefrom.

3. A scalpel comprising a handle and a blade holding part rigidly connected together and integral with each other, said handle and blade holding part formed by bending a piece of metal into a U-shape so as to form a structure with a back and two sides, but open at the bottom, the sides of the handle being of greater width than those of the blade holding part, the sides of the blade holding part being closer together than the sides of the handle portion, a blade, an engaging part fastened to said blade and extending part of the width of the blade, the lower edges of the said pieces of the blade holding part being bent inwardly so that the open space between them is large enough to permit the blade to enter but not large enough to permit the engaging part to enter, whereby the blade when inserted in the handle and moved longitudinally to the blade holding part, will be held against removal therefrom, the edges of the material at the end of the sides of the blade holding part being bent over so as to engage the end of the engaging part on the blade and limit the longitudinal movement of the blade when being placed in position.

In testimony whereof, I affix my signature in the presence of two witnesses this 24th day of May, 1913.

CHARLES A. SIMMONS.

Witnesses:
DENIE A. WALTERS,
FRANK P. STONE.